No. 738,355. Patented September 8, 1903.

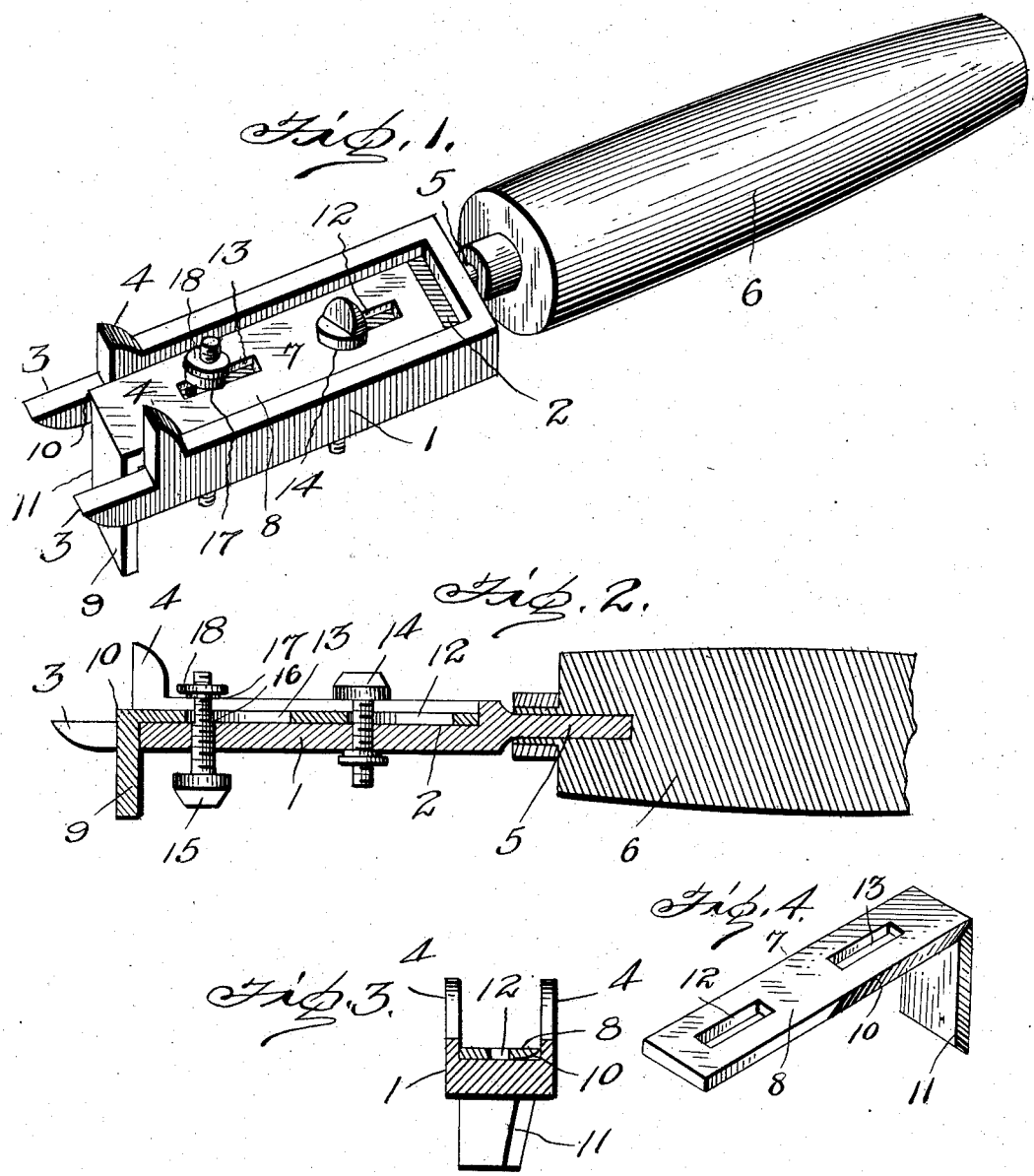

UNITED STATES PATENT OFFICE.

ARTHUR DON PUERNER AND THOMPSON G. HEINE, OF BUTTE, MONTANA.

CHANNELING-TOOL.

SPECIFICATION forming part of Letters Patent No. 738,355, dated September 8, 1903.

Application filed February 12, 1903. Serial No. 143,107. (No model.)

*To all whom it may concern:*

Be it known that we, ARTHUR DON PUERNER and THOMPSON GRAY HEINE, citizens of the United States, residing at Butte, in the county of Silverbow and State of Montana, have invented certain new and useful Improvements in Channeling-Tools; and we do declare the following to be a full, clear, and exact description of the invention, such as will enable others skilled in the art to which it appertains to make and use the same.

Our invention is an improved channeling-tool especially adapted for making outside channels for the soles of turn-shoes; and it consists in the peculiar construction and combination of devices hereinafter described and claimed.

The object of this invention is to provide an improved tool of this character in which the cutter is adjustable in two directions and adapted to make a channel of any desired width and depth.

In the accompanying drawings, Figure 1 is a perspective view of a channeling-tool embodying our improvements. Fig. 2 is a vertical longitudinal sectional view of the same. Fig. 3 is a transverse sectional view of the same. Fig. 4 is a detail view of the cutter-bit, showing the two cutting edges thereof.

In the embodiment of our invention we provide a guide-frame 1, which is preferably of the form here shown and is provided on one side with a longitudinal guide-seat 2, which is open at its outer end. At the outer end and at opposite sides of the guide-frame are two pairs of gage-arms 3 4, which are at right angles to each other. The same are here shown as formed integral with the guide-frame. The latter is provided at its inner end with a suitable stem 5, which forms the means for attaching the guide-frame to a handle 6. The cutter-bit 7 comprises an arm 8, which is disposed to lie in the guide-seat of the guide-frame, is adjustable longitudinally therein, and is also adjustable in a plane at right angles to its longitudinal axis, and an arm 9, which is at right angles to and is disposed at the outer end of the arm 8. The outer portion of the arm 8 is formed on one side with a cutting edge 10. The arm 9 has a cutting edge 11 on the same side, the said cutting edges converging and being disposed at right angles to each other. The arm 9 of the cutter-bit lies between the arms 3 of the guide-frame 1. The arm 8 of the cutter-bit is provided near its inner end with a longitudinal adjusting-slot 12 and is provided near its outer end with a similar slot 13. The outer portion of the said arm 8 is reduced in thickness on the side opposite the guide-seat of the frame 1, so that a certain degree of elasticity is imparted to the outer portion of the arm 8, which carries the arm 9. An adjusting-screw 14 operates in a threaded opening with which the guide-frame 1 is provided, extends through the slot 12, and bears on the outer side of the arm 8, its function being to permit longitudinal adjustment of said arm 8 and to clamp the same firmly to the guide-seat at any desired adjustment, hence enabling the channel cut by the tool to be of any desired width. An adjusting-screw 15 operates in the threaded opening with which the guide-frame is provided, extends through the slot 13 of the bit-arm 8, is provided with a shoulder 16, which bears against one side of the said arm 8 and is provided at its outer end with a washer 17, which bears on the outer side of the arm 8, and a clamping-nut 18, which bears on said washer. It will be understood that by turning this screw the cutter-bit may be adjusted to cut a channel of any desired depth. It will be further understood that the two edges 10 11, with which the cutter-bit is provided, cut the two sides of the channel simultaneously, so that the same is formed in the edge of a sole at a single operation of the tool.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described our invention, what we claim as new, and desire to secure by Letters Patent, is—

1. A channeling-tool having a holder provided on opposite sides with a plurality of angularly-disposed gage devices, and a cutter-bit secured to the holder and having angularly-disposed cutting edges, said cutting-bit lying between the gage devices on opposite sides of the holder, substantially as described.

2. A channeling-tool having a holder provided on opposite sides, at one end, with angularly-disposed gage-arms, and a cutter-bit comprising angularly-disposed arms, each provided on one side with a cutting edge, said cutting edges converging, one of said arms of the cutter-bit being secured on the holder, and the angular portion of said cutter-bit formed by the angular arms thereof being disposed between the gage-arms on the respective sides of the holder, substantially as described.

3. A channeling-tool comprising a holder having a pair of angularly-disposed gage-arms on each of two opposite sides at its outer end, a cutter-bit comprising a pair of angularly-disposed arms each provided on one edge with a cutting edge, said cutting edges converging, said cutter-bit being disposed with its angular portion between said pairs of gage-arms, and means to secure one arm of said cutter-bit to said holder, said means having provisions for adjustment of said arm both longitudinally and at an angle, substantially as described.

4. In a channeling-tool, the combination with a holding element, having gage devices, of a cutter-bit having arms, each provided with a cutting edge and disposed at an angle to each other, one of said arms being slotted longitudinally, forming a spring at its outer portion, and adjusting-screws operating in the slots of said arm, said adjusting-screws securing the cutter-bit to the holding element and adapting the cutter-bit to be adjusted both in the direction of the length of its slotted arm and in a direction at an angle thereto, one of the adjusting-screws having means to effect such angular adjustment of the cutting-bit, substantially as described.

In testimony whereof we have hereunto set our hands in presence of two subscribing witnesses.

ARTHUR DON PUERNER.
THOMPSON G. HEINE.

Witnesses:
T. L. NAPTON,
F. H. PILLING.